(12) United States Patent
Ejiri et al.

(10) Patent No.: US 6,834,082 B2
(45) Date of Patent: Dec. 21, 2004

(54) IMAGE TRANSMITTING SYSTEM FOR TRANSMITTING DYNAMIC IMAGE DATA

(75) Inventors: Satoru Ejiri, Miyagi (JP); Kazuo Ebina, Tokyo (JP)

(73) Assignee: NEC Corporation, Tokyo (JP)

( * ) Notice: Subject to any disclaimer, the term of this patent is extended or adjusted under 35 U.S.C. 154(b) by 635 days.

(21) Appl. No.: 09/730,400

(22) Filed: Dec. 6, 2000

(65) Prior Publication Data

US 2001/0003532 A1 Jun. 14, 2001

(30) Foreign Application Priority Data

Dec. 8, 1999 (JP) .......................................... 11-348265

(51) Int. Cl.$^7$ ................................................. H04N 7/12
(52) U.S. Cl. ............................. 375/240.24; 375/240.03
(58) Field of Search ........................ 375/240.03, 240.23, 375/240.24, 240.26, 240.29; 382/264; 345/611

(56) References Cited

U.S. PATENT DOCUMENTS

| | | | | |
|---|---|---|---|---|
| 4,860,283 A | * | 8/1989 | Takano et al. ............... | 370/470 |
| 5,515,377 A | * | 5/1996 | Horne et al. ........... | 370/395.64 |
| 5,933,607 A | * | 8/1999 | Tate et al. ............. | 370/395.61 |
| 6,167,061 A | * | 12/2000 | Nakatsugawa ............... | 370/480 |
| 6,215,824 B1 | * | 4/2001 | Assuncao .............. | 375/240.26 |
| 6,347,098 B1 | * | 2/2002 | Ejiri ........................... | 370/532 |
| 6,356,945 B1 | * | 3/2002 | Shaw et al. .................. | 709/231 |
| 6,359,883 B1 | * | 3/2002 | Lechleider .................. | 370/389 |
| 6,501,861 B1 | * | 12/2002 | Cho et al. .................... | 382/243 |
| 6,639,943 B1 | * | 10/2003 | Radha et al. .......... | 375/240.11 |

FOREIGN PATENT DOCUMENTS

| | | |
|---|---|---|
| JP | 8-181988 | 7/1996 |
| JP | 8-317384 | 11/1996 |
| JP | 10-23433 | 1/1998 |

* cited by examiner

*Primary Examiner*—Chris Kelley
*Assistant Examiner*—George A Bugg
(74) *Attorney, Agent, or Firm*—Young & Thompson

(57) ABSTRACT

An image transmitting system which maintains the same image resolution even when a line speed is set to a low speed. The image transmitting system basically comprises an image data conversion block, a quantization block, a variable-length coding block, smoothing buffers, output selectors, and a dequantization block. The image data conversion block converts input image data into a coefficient suitable for coding. The quantization block quantizes the coefficients obtained through conversion. The variable-length coding block codes the quantized coefficients. The first smoothing buffer smoothes the generated amount of data with respect to a first frame in a block, the second smoothing buffer smoothes the generated amount of data with respect to a second frame in the block, and the third smoothing buffer smoothes the generated amount of data with respect to a third frame in the block. The first output selector is used when selecting a line speed of 96 Kbps, and the second output selector is used when selecting a line speed of 128 Kbps. The quantization block reproduces the previous frame for use in an interframe conversion.

8 Claims, 5 Drawing Sheets

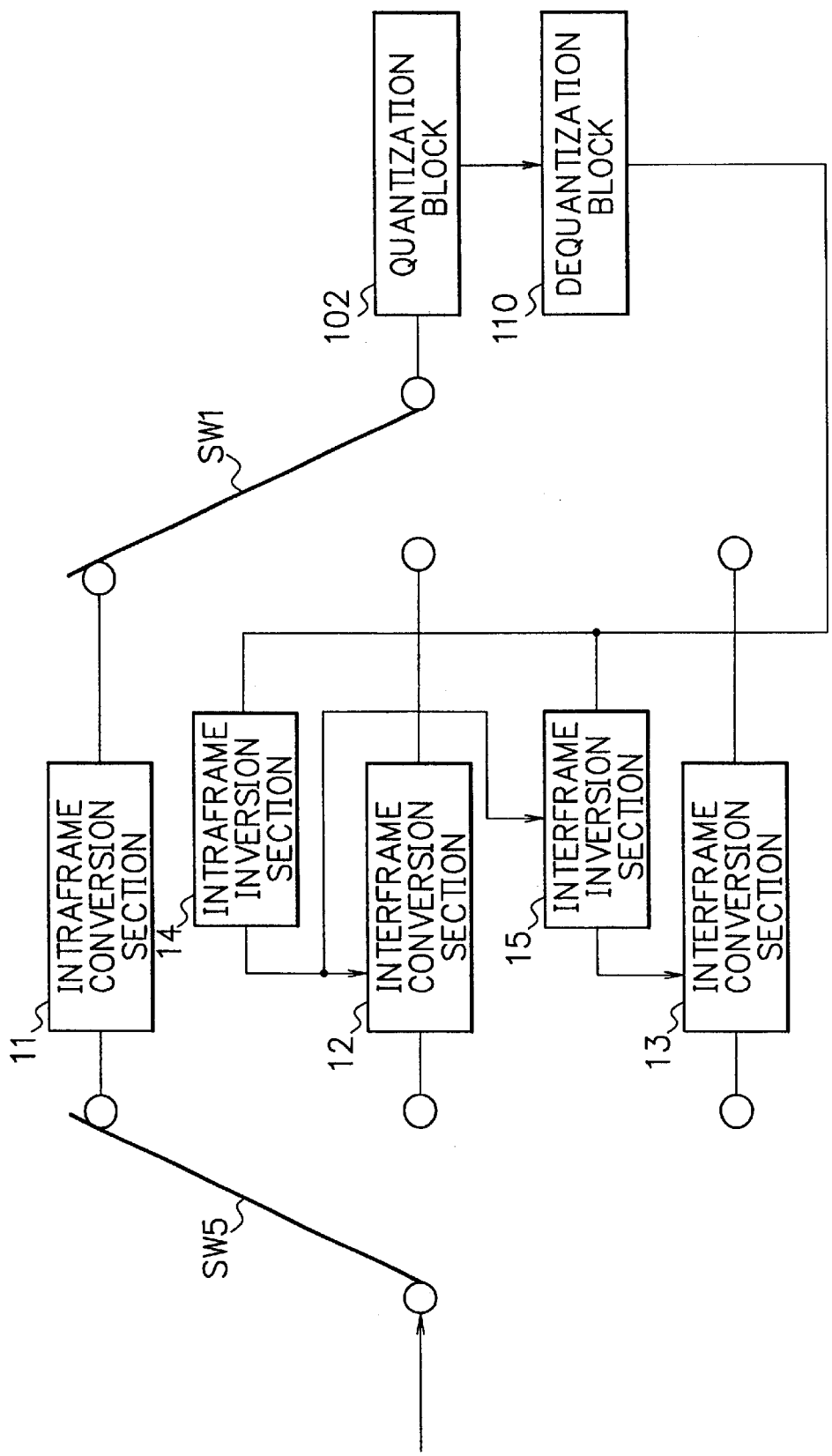

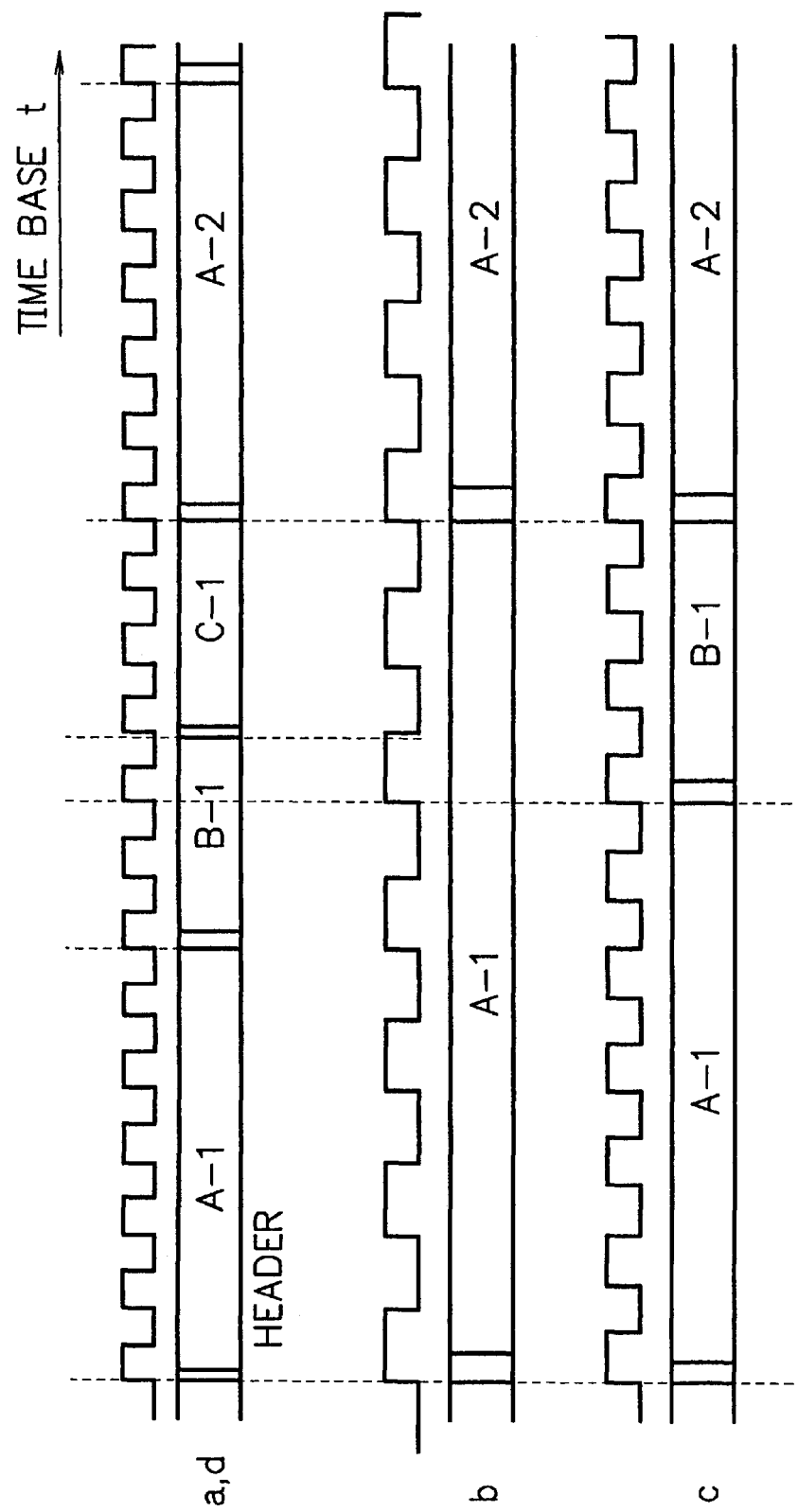

IMAGE TRANSMITTING SYSTEM FOR TRANSMITTING DYNAMIC IMAGE DATA

BACKGROUND OF THE INVENTION

The present invention generally relates to an image transmitting system, and more specifically to an image transmitting system which is capable of transmitting dynamic image data for use in TV conference, video telephone, and so forth.

DESCRIPTION OF THE RELATED ART

Generally, a typical image transmitting system comprises an information source converting section for converting input image data into a coefficient suitable for coding, a quantizing section for quantizing the coefficient, a variable-length coding section for generating a binary code word including "0" and "1" by variable-length-coding the quantized coefficient, a dequantizing section used for an information source conversion which uses a correlation between frames, and a buffer for smoothing the generated amount of code for transmission to a line with a particular fixed speed.

FIG. 1 is a diagram showing a conventional image transmitting system, which consists of an image data conversion block 1, a quantization block 2, a variable-length coding block 3, a dequantization block 10, a smoothing buffer 16 and a quantization controlling section 7.

The image data conversion block 1 converts input image data into a coefficient suitable for coding. The quantization block 2 quantizes the coefficient having been converted at the image data conversion block 1. The variable-length coding block 3 variable-length-codes the quantized coefficient in order to generate a binary code word including "0" and "1".

The dequantization block 10 is used for an information source conversion which uses a correlation between frames. The smoothing buffer 16 smoothes the generated amount of code for transmission to a line with a particular fixed speed. The quantization controlling section 7 operates quantization parameters in order to control the generated amount of code.

In the above-described conventional image transmitting system, changing a line speed is accomplished by changing a coding speed. Therefore, when a low speed line is selected, the generated amount of code per unit period has to be kept small, which consequently causes coarse coding of the quantized coefficient, resulting in reproducing a possible blurred image.

Accordingly, when one attempts to send an image of a document at a TV conference, etc., while selecting a low-speed line, for instance, it may be a problem that the transmitted image is blurred and the contents of the document become unrecognizable or difficult for reading.

SUMMARY OF THE INVENTION

The present invention has been achieved in order to solve such problem in the prior art, and it is an object of the present invention to provide an image transmitting system which is capable of having unchanged image resolution even when the line speed is set to a low-speed.

In accordance with the present invention, an image transmitting system comprises a plurality of line interfaces connected to lines with different line speeds, and image-codes data for transmission under the same resolution without having to depend on the selected line speed.

In other words, the image transmitting system of the present invention has a scalability structure on the time base.

In the present invention, instead of having an image resolution (space resolution, fineness) changed at the time of selecting a line with a lower speed, a resolution (smoothness) on the time base is changed.

In accordance with the present invention, in the image transmitting system, an input image is regarded as blocks, and a single block contains a plurality of frames arranged on the time base. In the image transmitting system, data conversion on a first frame is executed internally closed within a block; and data conversion on a second frame and frames beyond that is executed using a correlation between a subject frame and a frame before that. In this way, the image transmitting system classifies the input data into different kinds of image data in terms of frames, and executes quantization and variable-length coding on each kind of data. Then, the classified image data are inputted to different smoothing buffers, respectively.

In accordance with the present invention, on the basis of the selected line speed, the image transmitting system decides the absolutely necessary amount of generated code. Then, it is determined at which rate the generated amount of code should be transmitted to each smoothing buffer. At this time, since the coefficient generated after the closed conversion within the frame with respect to the first frame is more important than the second frame and the frames beyond that, a bit allocation is set larger. In other words, the average amount of generated code to be inputted to the smoothing buffer is set larger.

In this case, as to the optimum method of allocating the amount of generated code, there is an allocation method in which quantization distortion is set to a minimum, on the basis of a statistical distribution of coefficients obtained after the information source conversion. Among possible combinations of such allocation, the present invention connects with the smoothing buffer associated with the first frame when selecting the slowest line, with the smoothing buffers associated with the first and the second frames when selecting the line of a second lowest speed, and with the smoothing buffers associated with the $1^{st}, 2^{nd}, \ldots N^{th}$ frames when selecting the line of $N^{th}$ lowest speed.

In connecting to a plurality of smoothing buffers, switching of output of the smoothing buffers is executed in response to a detection of a break (i.e. a picture header when applying MPEG (Moving Picture-Coding Experts Group)) in a single frame worth of code within a smoothing buffer.

Thus, in the present invention, the coding speed does not decrease even when the line speed is decreased. Consequently, even when the line speed is set low, it is possible to always have the same image resolution without having a space resolution of each frame decreased.

BRIEF DESCRIPTION OF THE DRAWINGS

The above and further objects, and the novel features of the present invention will more fully appear from the following detailed description when the same is read in connection with the accompanying drawings, in which:

FIG. 4 is a block diagram showing an internal structure of an image data conversion block 1 shown in FIG. 3; and FIG. 5 is a diagram showing an operation of switches shown in FIG. 3 and FIG. 4.

DESCRIPTION OF THE PREFERRED EMBODIMENTS

Figure 1:
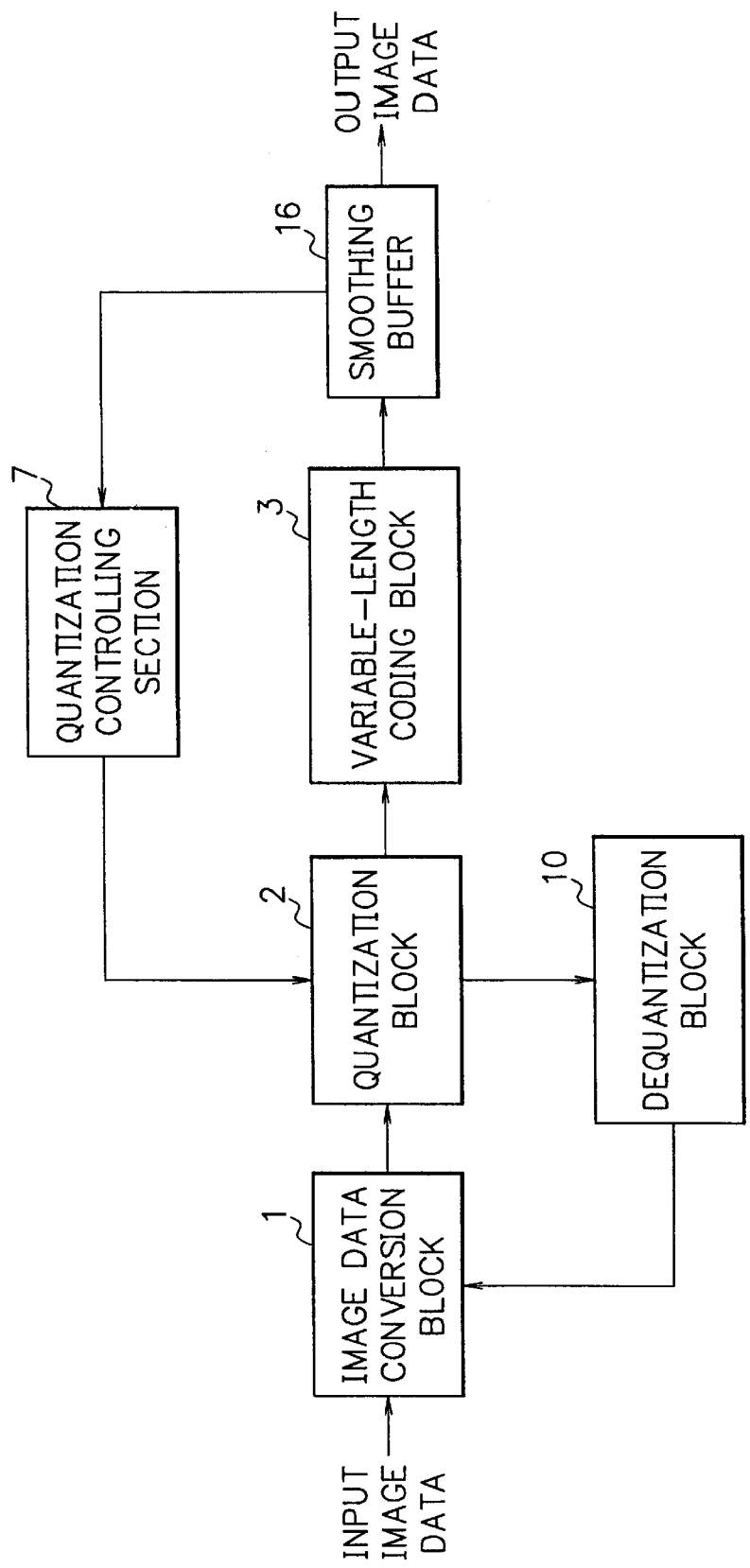
FIG. 1 is a block diagram showing a configuration of a conventional image transmitting system.

Referring now to the drawings, a description of a preferred embodiment of the present invention will be given in detail.

Figure 2:
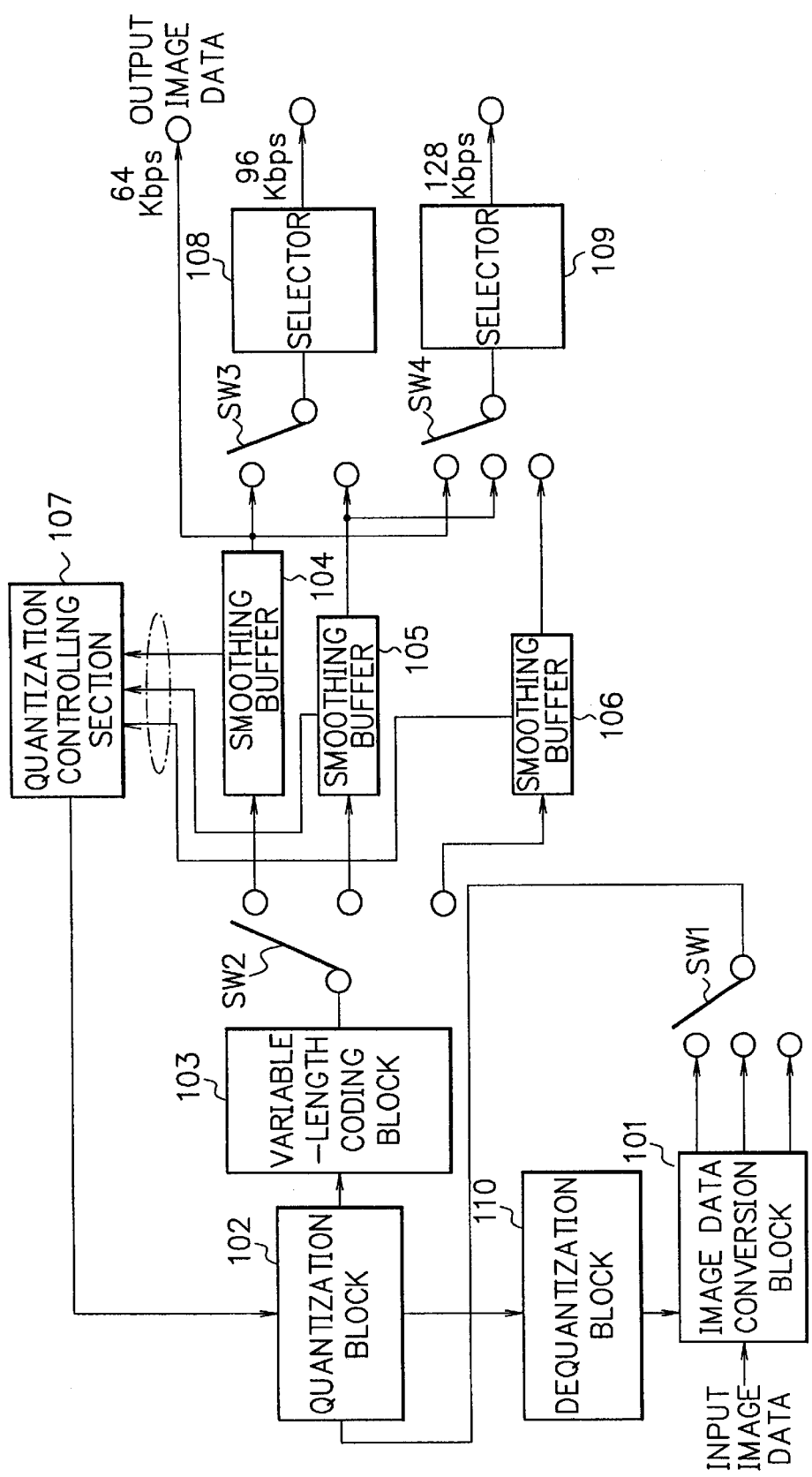
FIG. 2 is a block diagram showing a configuration of an embodiment of an image transmitting system of the present invention.

FIG. 2 is a block diagram showing a configuration of an embodiment of an image transmitting system in accordance with the present invention. In FIG. 2, the image transmitting system comprises an image data conversion block 101, a quantization block 102, a variable-length coding block 103, smoothing buffers 104, 105 and 106, a quantization controlling section 107, output selectors 108 and 109, a dequantization block 110, and switches SW1 to SW4.

The image data conversion block 101 is where the image data is converted into a coefficient suitable for coding. For this conversion, the image data conversion block 101 uses a DCT (discrete cosine transform) exploiting a low frequency spectrum concentration characteristic of an image, a sub-band division, and so forth.

The quantization block 102 is where the coefficients obtained through conversion are quantized. In this quantization process, most important coefficients are closely quantized, while less important coefficients are roughly quantized. The variable-length coding block 103 is where the quantized coefficients are coded. In this coding process, those quantized coefficients having high occurrence frequency are coded into long code words while those quantized coefficients having low occurrence frequency are coded into short code words.

The smoothing buffer 104 is a buffer which smoothes the generated amount of data with respect to a first frame in a block. The smoothing buffer 105 is a buffer which smoothes the generated amount of data with respect to a second frame in the block. The smoothing buffer 106 is a buffer which smoothes the generated amount of data with respect to a third frame in the block.

The quantization controlling section 107 is a controller which controls the generated amount of data through operating on quantization parameters. The output selector 108 is a selector used when selecting a line speed of 96 Kbps. The output selector 109 is a selector used when selecting a line speed of 128 Kbps. The dequantization block 110 is where a previous frame for use in an interframe conversion is reproduced.

Figure 3:
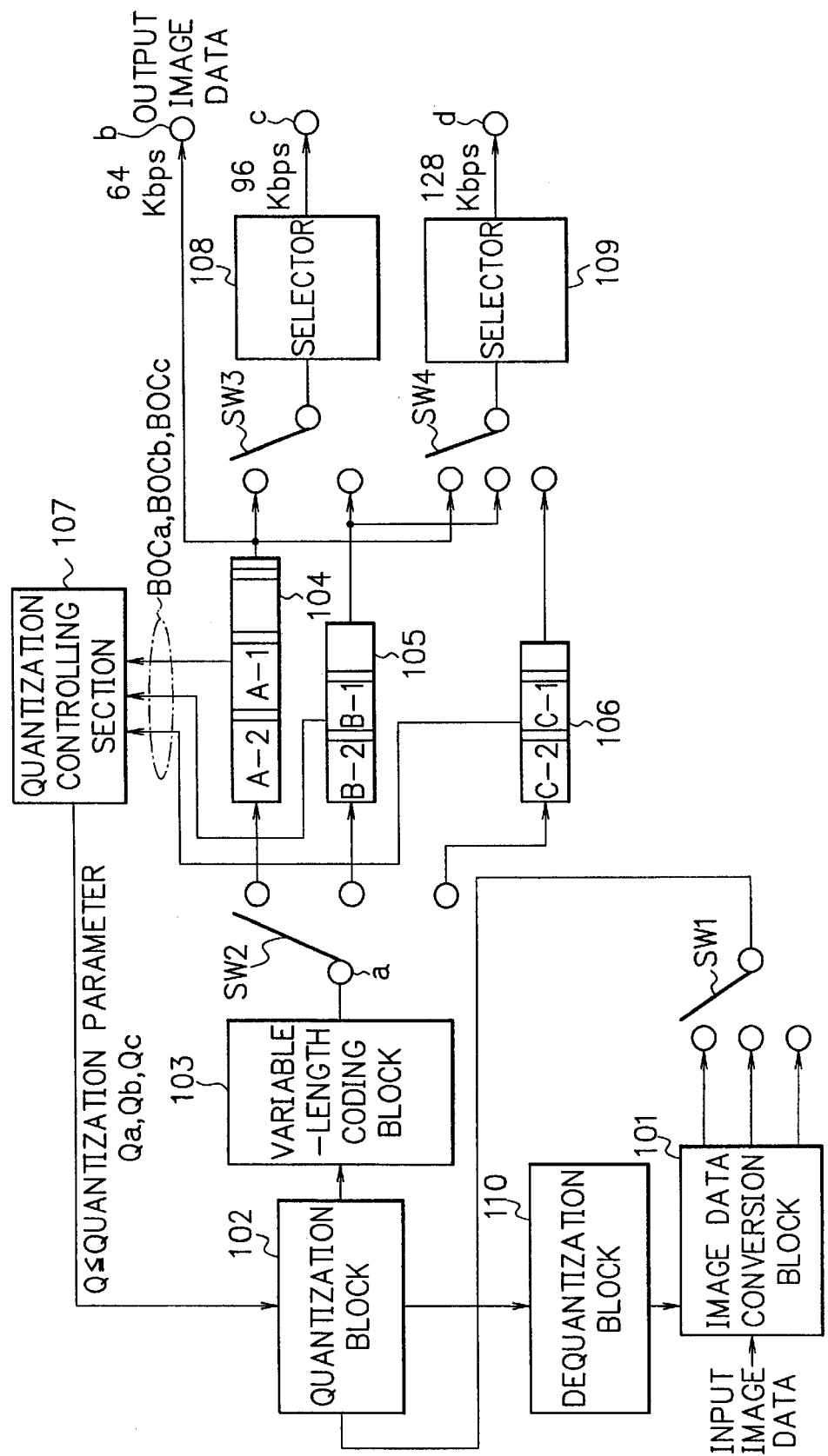
FIG. 3 is a block diagram showing a configuration of one example of the embodiment of the image transmitting system in accordance with the present invention.

FIG. 3 is a block diagram showing a configuration of one example of the embodiment of the image transmitting system in accordance with the present invention. In FIG. 3, similarly to the previously-described embodiment of the present invention, the image transmitting system of this example comprises an image data conversion block 101, a quantization block 102, a variable-length coding block 103, smoothing buffers 104, 105 and 106, a quantization controlling section 107, output selectors 108 to 109, a dequantization block 110, and switches SW1 to SW4.

FIG. 4 is a block diagram showing an internal structure of the image data conversion block 101 shown in FIG. 3. In FIG. 4, the image data conversion block 101 comprises an intraframe conversion section 11, interframe conversion sections 12 and 13, an intraframe inversion section 14, an interframe inversion section 15, and a switch SW5.

FIG. 5 is a diagram illustrating the operations of the switches SW1 to SW5. The operation in the example of the embodiment of the present invention will be described with reference to FIG. 3 to FIG. 5.

In the image transmitting system of this example, the image data conversion block 101 turns the image data into blocks on the time base, and classifies the image data in a block in terms of frames by executing an internally closed conversion with respect to a first frame in the block, and as to a second frame and beyond that, executing a conversion using a correlation between the previous frame.

For example, the input image data is classified into three different kinds of data in terms of a unit of three frames. As shown in FIG. 4, an output to the first frame is data within the frame being converted at the intraframe conversion section 11 by DCT, or sub-band division, etc., an output to the second frame is differential data with respect to a difference between the first and the second input frames produced by the interframe conversion section 12, and an output to the third frame is differential data with respect to a difference between the second and the third frames produced by the interframe conversion section 13 on the basis of the output information of the second and the first frames.

Each kind of data being classified at the image data conversion block 101 is then quantized by the quantization block 102 and variable-length-coded by the variable-length coding block 103, respectively, and inputted to one of the smoothing buffers 104 to 106.

As shown in FIG. 3, in case of selecting a line speed of 64 Kbps, information of the smoothing buffer 104 is outputted to be transmitted to the line (not shown). In case of selecting a line speed of 96 Kbps, information of the smoothing buffers 104 and 105 is alternately outputted in terms of each frame, to be transmitted to the line, by the selector 108 and the switch SW3. In case of selecting a line speed of 128 Kbps, information of the smoothing buffers 104, 105 and 106 is alternately outputted in terms of each frame, to be transmitted to the line, by the selector 109 and the switch SW4.

In these cases, the average number of assigned bits assigned to a single unit of three frames is set as follows:

$$128 \text{ [Kbits/sec]} \times 3/29.97 \text{[sec]} = R \text{ all [bits]} \quad \text{(Limiting Condition 1)}$$

Furthermore, the average number of assigned bits for each frame is set as follows:

For the first frame: R all×½ [bits]

For the second and third frames: R all×¼ [bits] (Limiting Condition 2)

Furthermore, buffer occupancy information of BOCa, BOCb, and BOCc for the smoothing buffers 104, 105 and 106 are inputted to the quantization controlling block 107, so that each buffer does not overflow or underflow (Limiting Condition 3). In this case, quantization parameters Qa, Qb, and Qc are updated for controlling the generated amount of code for each frame.

The change of line speed has nothing to do with the image data conversion, quantization, variable-length coding, or the coding process in the quantization control. Therefore, fineness of each frame is always the same as the full rate of 128 Kbps, no matter what line speed is selected.

Next, switching of data within the smoothing buffers 104 to 106, and the switching operation of switches SW1 to SW5 will be described. The switches SW1 and SW2 switch synchronously with the switch SW5 that switches for every input of an image frame. As to the quantization parameter Q used in the quantization block 102, quantization parameters Qa, Qb, and Qc corresponding to the frames in the block subjected to block quantization are selected.

As a result, as shown by "point a" in FIG. 5, coded data after variable-length coding, i.e. intraframe coded data (A-1, A-2, . . . ), and coded data (B-1, B-2, . . . , C-1, C-2, . . . ) using correlation between frames, are outputted by turns with headers showing separations between frames. Then as shown in FIG. 3, those data are assigned to the smoothing buffers 104, 105 and 106, respectively.

In case of selecting a line with a line speed of 64 Kbps, data is successively outputted only from the smoothing buffer 104 at a rate of 64 Kbps, and thus data as shown by "point b" in FIG. 5 is outputted.

In case of selecting a line with a line speed of 96 Kbps, the selector 108 executes a header detection, and the switch SW3 is switched in response to each detection of a header, while data is continuously read out at a rate of 96 Kbps, thus outputting data as shown by "point c" in FIG. 5.

Furthermore, in case of selecting a line with a line speed of 128 Kbps, the selector 109 executes a header detection, and the switch SW4 is switched in response to each detection of a header, while data is continuously read out at a rate of 128 Kbps, thus outputting data as shown by "point d" in FIG. 5.

In this way, whichever line is selected, the coding speed is the same as the maximum value of the line speed that the system has. Therefore, even when the line speed becomes lower, the image resolution (space resolution and fineness) does not change, and thus the image does not get blurred. Even when the line speed is set to a low speed, the system is capable of not having to change the image resolution.

As described above, in accordance with the present invention, the system has a plurality of line interfaces for different line speeds, and whichever line speed is selected, the system is capable of not having to depend on the selected line speed, and image-coding data under the same resolution for transmitting the data. Therefore, the present invention exhibits an effect that the image resolution can be maintained unchanged even when the line speed is set slower.

While the preferred embodiments of the invention have been described using specific terms, such description is for illustrative purposes only, and it is to be understood that changes and variations may be made without departing from the spirit or the scope of the following claims.

What is claimed is:

1. An image transmitting system comprising a plurality of line interfaces connected to lines with different line speeds, the line interfaces image-coding data for transmission under the same resolution without having to depend on the selected line speed, wherein an input image is regarded as blocks, a single block containing a plurality of frames arranged on the time base, the system further comprising:

a frame-closed data conversion means for executing data conversion of a first frame in a block on the time base, the data conversion being internally closed within the block; and a correlation data conversion means for executing data conversion with respect to a second frame and frames beyond that by turns, converted data being correlation data between a subject frame and a frame before that.

2. An image transmitting system as claimed in claim 1, further comprising:

a means for executing conversion, quantization, and variable-length coding of image data with respect to each frame in the block; and a plurality of buffers associated with the frames in the block, each holding a corresponding frame.

3. An image transmitting system as claimed in claim 2, wherein the plurality of buffers are smoothing buffers for rate control.

4. An image transmitting system as claimed in claim 3, further comprising:

a means for controlling generated amount of code per block time to keep it stable, by monitoring the smoothing buffers with respect to the frames in the block, and by adjusting quantization parameters on the basis of each content of the smoothing buffer.

5. An image transmitting system as claimed in claim 4, wherein the means for controlling generated amount of code decides a fixed value for the generated amount of code for the smoothing buffers on the basis of certain limiting conditions with respect to a selected line speed and an importance of the converted data.

6. An image transmitting system as claimed in claim 3, further comprising:

a switching section for detecting and outputting a head of single frame worth of coded data from a smoothing buffer corresponding to a first frame within the block, transmitting said coded data to a line, and by turns, outputting single frame worth of coded data from a smoothing buffer corresponding to the next frame within the block.

7. An image transmitting system as claimed in claim 4, further comprising:

a switching section for detecting and outputting a head of single frame worth of coded data from a smoothing buffer corresponding to a first frame within the block, transmitting said coded data to a line, and by turns, outputting single frame worth of coded data from a smoothing buffer corresponding to the next frame within the block.

8. An image transmitting system as claimed in claim 5, further comprising:

a switching section for detecting and outputting a head of single frame worth of coded data from a smoothing buffer corresponding to a first frame within the block, transmitting said coded data to a line, and by turns, outputting single frame worth of coded data from a smoothing buffer corresponding to the next frame within the block.

* * * * *